Figure 1:
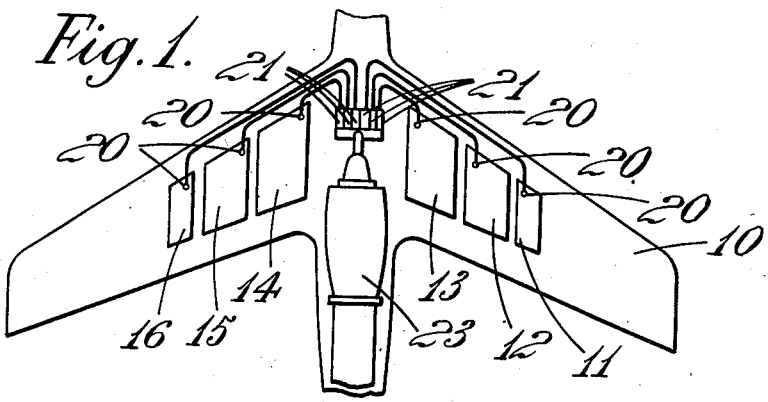

April 12, 1960 T. E. GODDEN ET AL 2,932,309
LIQUID SUPPLY SYSTEMS SUCH AS FUEL SYSTEMS
Filed Feb. 12, 1954 2 Sheets-Sheet 1

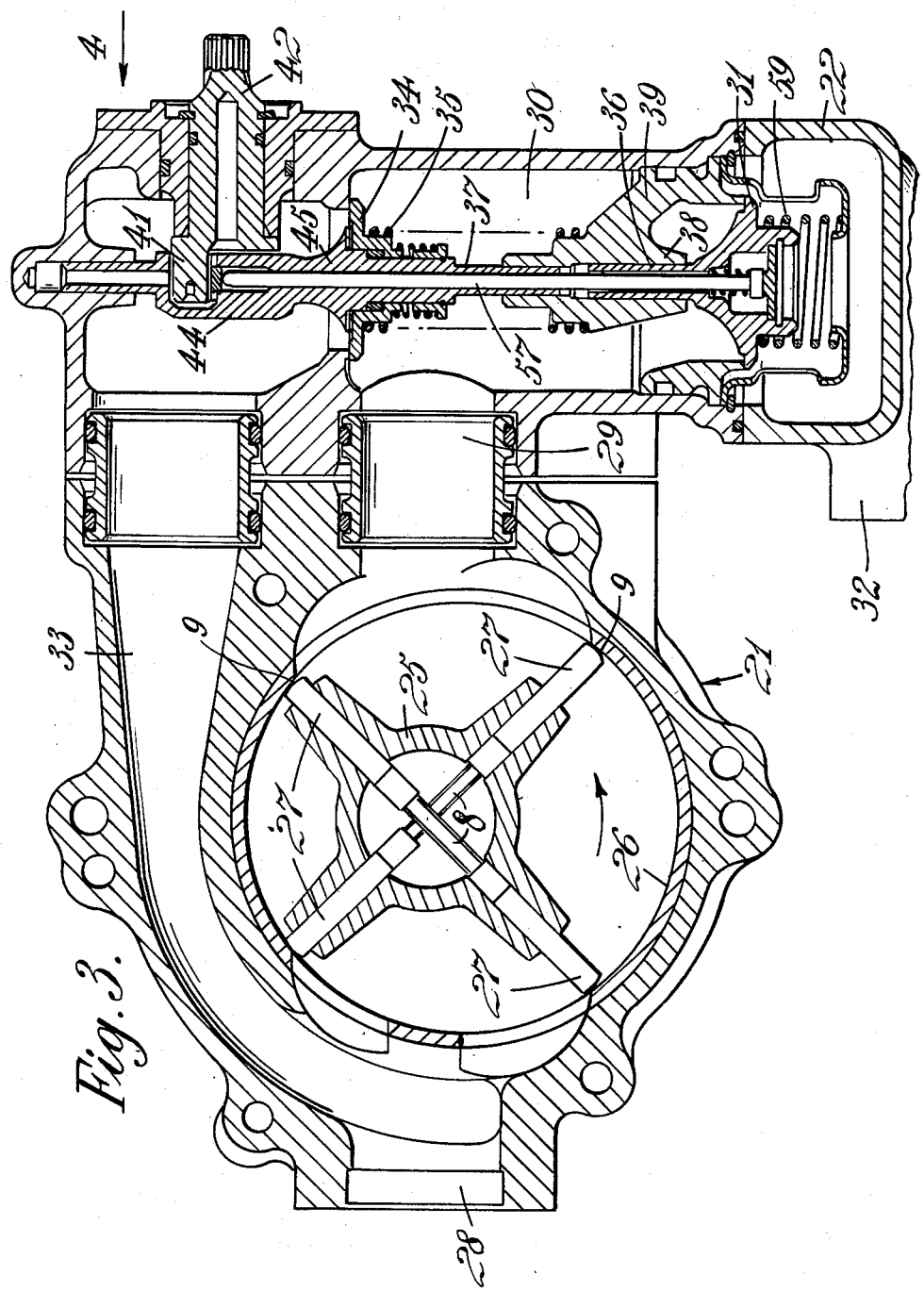

United States Patent Office 2,932,309
Patented Apr. 12, 1960

2,932,309

LIQUID SUPPLY SYSTEMS SUCH AS FUEL SYSTEMS

Thomas Edward Godden and Edward Hollingworth Morris, Gloucester, England, assignors to Rotol Limited, Gloucester, England, a British company Application February 12, 1954, Serial No. 410,000

Claims priority, application Great Britain January 12, 1954

13 Claims. (Cl. 137—99)

This invention relates to liquid supply systems of the kind comprising a plurality of reservoirs from which liquid is supplied through constant volume positive displacement metering devices connected to deliver to a common point of usage.

Such devices fall into several categories.

In one, the metering devices are connected one to each reservoir and are coupled to rotate together and have volumes which are in the same proportion to one another as the volumes in which the liquids from the several reservoirs have to be delivered to the point of usage.

In another, the metering devices are connected one to each reservoir and are coupled to rotate together and have volumes which are in the same proportion to one another as are the volumes of the reservoirs to which the metering devices are connected so that the proportion of liquid supplied from any one reservoir to the whole volume of the liquid supplied is the same as that of the volume of the reservoir to the whole volume of all the reservoirs. In such an arrangement the reservoirs may be fuel tanks, the liquid a fuel, and the point of usage an engine. Usually, in such an arrangement, a plurality of the metering devices are connected to deliver, each through a non-return valve, to a fuel pipe common to them which leads to the engine.

Such fuel systems are employed in aircraft where it is desirable to ensure that the proportion of fuel supplied from any one tank to the total is the same as the proportion of the volume of that tank to the total volume of all the tanks so as to ensure that the trim of the aircraft does not become upset due to proportionately more fuel being supplied from one tank than from another; for example, from one tank or group of tanks than from a corresponding tank or group of tanks on the other side of the aircraft; or from tanks in different positions in the fuselage.

A disadvantage that has been met with, in the operation of such a fuel system, is that if for any reason a metering device seizes up, the other metering devices to which it is coupled will also cease to rotate, and therefore also cease to pass fuel. The fuel in the tanks to which these metering devices are connected is then trapped in these tanks and is not available for use in the engine.

Another disadvantage which has been met with is that if the coupling between two metering devices fails, then one or more of the metering devices may cease to rotate, or, if they continue to rotate, may do so at a different speed from the remainder of the metering devices on the other side of the failed coupling.

According to this invention a liquid supply system of the kind described has a bypass round the metering device and a normally closed bypass valve in this bypass, which bypass valve is provided with means operable to open it.

In use of a liquid supply system according to the invention, when an operator discovers that a metering device for example one of a battery of connected metering devices, is not functioning correctly, he can open the bypass valve in the bypass to that metering device to enable fuel from the reservoir to flow to the point of usage without passing through that metering device.

Preferably the bypass valve is spring loaded to its closed position against the inlet pressure to the metering device in the by-pass of which the valve is situated. With such an arrangement, the spring load on the bypass valve has to be such that it, together with the pressure load due to the discharge pressure of the metering device, is always greater than the pressure supplying the metering device, so that the bypass valve remains shut during normal operation of the metering device.

Each metering device is usually connected to be supplied with liquid from the discharge of a booster pump, which may be a centrifugal pump, in or adjacent to its associated liquid reservoir, and the pressure supplying the metering device is therefore the discharge pressure of the booster pump. It will be appreciated that, in a liquid supply system according to the invention, when the bypass valve in the bypass of a metering device is held open, the liquid passing through it is not metered so that it is in the correct proportion to liquid supplied by the other reservoirs, but, with a liquid supply system according to this invention, liquid which would otherwise be trapped on the upstream side of the metering device, is rendered usable.

If a metering device is for some reason prevented from operating, with consequent cessation of operation of the other metering devices to which it is coupled, there will be a substantial or complete loss of pressure on the discharge side of all the metering devices. Each metering device may then be bypassed by the operator opening the bypass valves, as described in the preceding paragraph.

According to another feature of the invention means may be provided to open the discharge non-return valve. Preferably this second means is such that it is operable independently of that of the bypass valve in the bypass, although they may have parts, such as the operating lever, in common.

It is desirable to be able to open the discharge non-return valve in a fuel system according to the invention so that, during refuelling the fuel can be supplied from a single fuelling connection to the various tanks, each through its associated metering device. By refuelling through the metering devices, it is ensured that the fuel is supplied to the various tanks in correct proportions, so that all the tanks become full simultaneously, or, for short range flights, that they are only partly filled but in the correct proportions.

Preferably, when means are provided to open both the bypass valve and the discharge non-return valve of the metering device, they are capable of opening both valves simultaneously. This enables any tank which has not become full at the same time as the others to be topped up without supplying fuel through the metering devices and so driving the metering devices.

For instance, the fuel tanks may each be provided with a fluid operated switch which, when a tank is full, closes to complete a circuit and causes an actuator to be operated to close the discharge non-return valve of that tank's metering device, to prevent any more fuel from being admitted to that tank. The bypass valve is left open to permit the associated metering device to rotate freely by circulating fuel through its bypass passage. This process would be repeated on other tanks as they became full.

In liquid supply systems according to the invention, the metering devices of a number of reservoirs are all connected together and may be driven as motors by the pressure drop across them or may be driven from an independent source of power, and it will be appreciated that, even in an arrangement where the metering devices are driven as motors, when the pressure drop across any one metering device drops, as will occur when the booster pump of that metering device ceases to operate and the metering device is fed by gravity head or suction through the impeller of the booster pump, the other metering devices will continue to drive the metering device so fed, so that liquid will be taken from the tank in which the booster pump has failed in the correct proportion.

Another drawback to which liquid supply systems of the kind with which the present invention is concerned are liable, is that should one tank empty before the others, its metering device, being a constant volume device, will pump vapour or air, which will mix with the liquid passing through the other metering devices from the other tanks.

Another feature of the present invention provides a system which overcomes this difficulty and according to this feature the metering devices may all discharge through their discharge non-return valves to a common header which is provided with a vent valve of the kind which opens when gas collects in the top of the header but which closes when the header is filled with liquid. For instance, the vent valve may be operated by a float in the header. When one of the metering devices pumps air or vapour into the system, this air or vapour collects as a gas in the top of the common header and is then vented through the vent valves so that it is not passed to the engine.

Alternatively, vent valves may be fitted to the discharge of each metering device before its discharge non-return valve.

Figure 2:
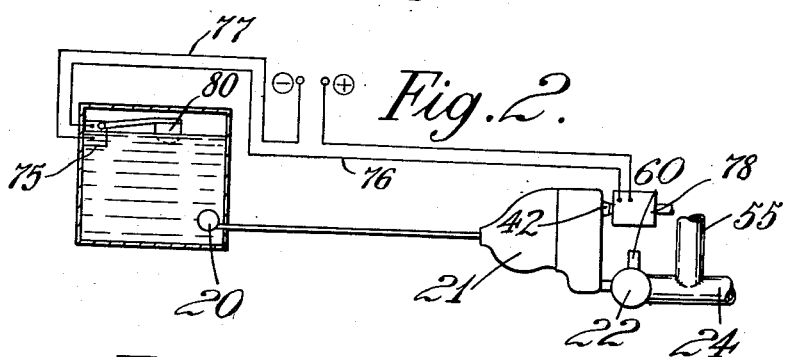
Figure 4:
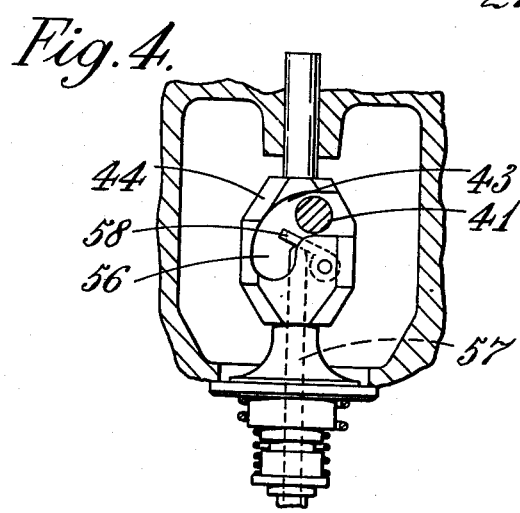

One embodiment of this invention will now be described with reference to the accompanying drawings of which, Figure 1 is a diagram of the fuel system of an aircraft, Figure 2 is a diagram of part of the fuel system shown in Figure 1, Figure 3 is a sectional view of a metering device and its associated valves employed in the fuel system of Figure 1, and Figure 4 is a view of parts of Figure 3 to a larger scale viewed in the direction of the arrow 4.

Referring to the drawings, Figure 1 shows an aircraft 10 which has wing tanks 11–16 arranged three in each wing. Fuel from each tank is fed through a centrifugal booster pump 20 to a metering device 21 whence it is discharged into a header 22 common to all the metering devices and thence into the fuel system of a propulsion engine 23 of the aircraft.

Figure 2 shows more clearly the fuel system between one of the tanks 11 and the common duct 24 through which fuel from all the tanks passes to the engine.

The construction of one metering device is illustrated more clearly in Figure 3, from which it will be seen that the metering device 21 is of the kind which comprises a rotor 25 eccentrically mounted in a circular chamber 26, the rotor having a plurality of vanes 27 the outer edges 9 of which are resiliently urged into contact with the internal cylindrical wall of the chamber by means of springs 8. As is well known, such a construction constitutes a constant volume pump or motor and in this case is driven as a motor by the discharge pressure of the booster pump 20 which is connected to the inlet 28 the vanes 27 being reciprocated with respect to the rotor as the rotor is rotated.

It may here be mentioned that the rotors 25 of all the metering devices are connected together so that they rotate at the same speed and that all the metering devices have a circular chamber 26 of the same radius. The width of the chambers 26 and of the vanes 27 and the eccentricities of mounting of the rotors 25 are selected in order to give the metering devices different capacities, such that the capacity of any one metering device to that of any other metering device will be in the same proportion as are the volumes of the fuel tanks to which they are connected.

Since the capacities of the metering devices are in the same proportion to one another as the volumes of the tanks to which they are connected, and, since the rotors of all the metering devices rotate at the same speed, the proportion of the volume of fuel taken from any one tank to the volume of the whole fuel will be the same as the proportion of the volume of that tank to the whole volume of all the tanks and, in flight, the trim of the aircraft will not be upset because proportionately more fuel is taken from one tank than from the corresponding tank on the other side.

As shown in the drawings, each metering device discharges through a duct 29 into a valve space 30 and thence through a spring-loaded non-return discharge valve 31 into the header 22 (Figures 1 and 2) into which all the metering devices discharge.

There is also provided a bypass duct 33 which bypasses the constant volume metering device and discharges into the valve space 30 through a normally closed bypass valve 34 which is normally kept closed by a spring 35. The valves 31 and 34 have valve stems 36 and 37 which are coaxial with one another and are guided by a sleeve 38 mounted by arms 39 from the wall of the valve chamber 30.

In use of the fuel system, a constant volume metering device may fail to pump fuel even though it is properly supplied by its booster pump 20. If this happens the non-return discharge valve 31 will close and the pressure will fall in the valve chamber 30. Under these conditions fuel would normally be trapped in the tank 11 unless bypass valve 34 can be opened so that it is supplied by the booster pump through the bypass 33 to the valve chamber 30.

In order to enable an operator to open the bypass valve 34, there is provided a crank 41 on a shaft 42 from which there is a suitable transmission to a lever (not shown) under control of the operator. As best seen in Figure 4, this crank 41 is received in a slot 43 cut in a protuberance 44 on the stem 45 of the valve 34. On rotating the crank clockwise as viewed in Figure 4, the crank comes into contact with the lower wall of the slot 43 and can force the bypass valve 34 open against the action of the spring 35 (which assists in normally keeping the valve closed) so as to permit fuel from the booster pump to pass through the bypass into the valve chamber 30. It will be appreciated that the booster pump discharge pressure is higher than that normally prevailing in the valve space 30 and so will open the non-return valve 31.

The fuel passed through the bypass 33 will not be metered proportionately to that supplied from other tanks but it will be appreciated that it is rendered usable and will not be trapped in the tank 11.

In the three preceding paragraphs there is described the bypassing of fuel in relation to failure of one metering device. The most probable type of failure, is the seizure of the rotor of a metering device or of a connection between adjacent metering devices. Either of these failures can result in an entire battery of metering devices ceasing to operate and therefore ceasing to deliver fuel. In these circumstances all the bypass valves of a battery of metering devices may be opened in order that the fuel which would otherwise be trapped in the tanks may be rendered usable.

As has been mentioned above another defect to which fuel systems such as that shown in Figure 2 are liable is that the booster pump 20 may fail to operate successfully and thus fail to supply the metering device 21 with adequate fuel. This defect is obviated in the fuel system shown in Figure 2 by the provision of centrifugal type of booster pump 20 which enables fuel to pass through the impeller of the pump should it cease to rotate. Thus when the booster pump 20 is not discharging fuel, fuel is supplied from tank 11 to the metering device 21 under gravity head, or by suction from the metering device. When this happens the fuel is still metered in the correct proportion to that supplied from the tanks since if a metering device to which the fuel is supplied through the inoperative booster pump 20 is not itself driven by the fuel pressure in its own supply line, the other metering devices which are connected to that one are driven and so drive it.

With positive displacement metering devices, this difficulty can be overcome by providing a bypass with a non-return valve in it to permit flow under gravity head from the tank, past the booster pump. In order to refuel the tanks, there is provided a single refuelling connection (not shown) which is connected to the duct 55 (Figure 2) leading into the duct 24 common to all the tanks. It will be appreciated that normally fuel so supplied could not reach the tanks since it would be prevented by the non-return discharge valve 31 of the metering devices and it is thus necesary to make provision for opening these non-return valve. In this embodiment this is achieved by rotating the crank 41 anti-clockwise as viewed in Figure 4.

It will be seen from Figure 4 that the slot 43 has a circular portion 56 which is centered coaxially with the axis of rotation of the shaft 42 so that the crank 41 can be rotated round the portion 56 of the slot without moving the valve stem 45. However, the discharge valve 31 has a valve rod 57 which passes up through a central bore in the valve stem 37, 45 and a pivot lever 58 is mounted in the formation 44 and rests on the top of the valve stem 57. As the crank 41 is moved anti-clockwise as viewed in Figure 4, it contacts the end of the lever 58 and further rotation of the crank then causes the rod 57 to be pressed downwards and thus open the discharge valve 31 against the action of its spring 59. Thus when the crank 41 is rotated anti-clockwise as viewed in Figure 4, fuel is permitted to flow from the duct 32 through the non-return discharge valve 31 to the valve chamber 30, whence it can flow through the metering device 21 to the tank.

It will be appreciated that since fuel passes through all the metering devices 21 when refuelling, it will be split up between various tanks 11–16 proportionaly to their volumes, so that all the tanks should become full, or partly filled in proportion to the volumes, at the same time, if the fuel in them is at proportionate levels when refuelling is started.

However, one tank may be emptier than the others when refuelling is commenced and in such a circumstance it is proposed to defuel all the tanks, for example by the suction pump of the fuel tender, before refuelling is commenced. By doing this, one can check that the disparity in level at the start of fuelling is not due to one of the metering devices functioning wrongly. Any tank can be topped up after the others have been completely filled, since the crank 41 can be rotated sufficiently far to ensure that both the valves 31 and 34 are opened simultaneously. This can be done by rotating the crank 41 clockwise to a greater extent than is necessary to open the valve 34. During initial clockwise rotation, the valve 34 is opened and continues to open until the valve stem 37 moves down into contact with the top of the valve stem 36. Further rotation of the crank 41 will then cause both valves to open together and fuel can then be supplied from the duct 32 past the valve 31 into the valve space 30 and thence past the valve 34 and through the duct 33 to the fuel tank 11 without passing through the metering device 21.

Alternatively the fuel tanks may each be provided with a fluid operated switch 75 (see Figure 2), which, when the tank is full closes to complete an electric circuit through conductors 76, 77 and cause an actuator 78 to be operated to close the non-return discharge valve of that tank's metering device to prevent any more fuel from being admitted. In the construction shown in Figure 2 the switch 75 is operated by a float 80. The bypass valve is allowed to remain open, to permit the metering device to rotate freely by circulating fuel through the bypass passage. This process would be repeated on other tanks as they become full until all the tanks were full.

If one of the tanks 11–16 should become empty during flight before the remaining tanks, then air or fuel vapour will be supplied to its metering device 21 and, because the metering device is a constant volume device, will be passed into the valve chamber 30 and may find its way into the header 22. It is undesirable for air or fuel vapour to be supplied to the fuel system of the engine 23, and in order to prevent this being done the header 22 has a number of vent valves 60 fitted to it which may be of any convenient construction and operate so that they will vent any vapour collecting in the header 22 but will prevent the escape of liquid. They may for instance be float operated to open when the float sinks due to vapour collecting in the top of the header 22 and to be closed when the float is lifted by liquid in the header 22.

It will be appreciated that the above fuel system has been described by way of example only and is not intended to limit the invention. For instance the constant volume metering devices 21 may be driven from the engine 23, but may be driven by an electric motor or in any other convenient way, instead of being driven as motors by the pressure drop across them.

Further only one battery of metering devices 21 is employed in the fuel system described above. In more complex fuel systems where the fuel tanks are widely distributed, it may prove more convenient to have several batteries of metering devices separated from each other, but it will be appreciated that they must be driven at the same or related speeds in order to ensure that the volume of fuel taken from the tanks connected to one battery of metering devices is in the correct proportion to that taken from the tanks connected to another battery of metering devices. This may be achieved for example by driving each battery of metering devices by an electric motor, the speeds of rotation of the several electric motors having been synchronised, as would be the case if the motors were synchronous motors connected to the same A.C. supply.

It will also be appreciated that separate operator controlled means may be provided for opening the normally closed bypass valve and the non-return discharge valve of each metering device, but it is believed that the above described arrangement in which a common operator control lever is provided for opening these valves independently of one another is more convenient.

The application of the liquid supply proportioning system and flow proportioning devices which are the subject of this invention has been described above in relation to the fuel system of an aircraft. It will be appreciated however that the invention has other applications in which liquids from a plurality of tanks have to be proportioned before being discharged to a point of usage, and that in such applications different liquids may be supplied in correct proportions. For example, the invention may be applied to the proportioning of two different liquids to be supplied in predetermined proportions to form a combustible mixture in a rocket motor used for propelling an aircraft. Of course in such applications for dealing with different liquids, the replenishing of the various liquid reservoirs will have to be made from separate sources, and the replenishing connections will have to be upstream of the discharge non-return valves of the metering devices.

We claim:

1. In an aircraft, a liquid fuel supply system comprising a plurality of liquid reservoirs from which liquid is normally to be supplied in unison, a plurality of conduits one from each of said reservoirs, a plurality of positive displacement metering devices one connected to each of said conduits, said metering devices being coupled to rotate together, a plurality of discharge ducts one connected to each of said positive displacement metering devices, a bypass round at least one of said positive displacement metering devices from the conduit to which said one of said positive displacement metering devices is connected to the discharge duct connected to said one of said positive displacement metering devices, a normally closed bypass valve in said bypass, and means operable independently of said one of said positive displacement metering devices, said means being operatively connected with said bypass valve and operable to open said bypass.

2. In an aircraft, a liquid fuel supply system comprising a plurality of liquid reservoirs, a plurality of conduits one from each of said reservoirs, a plurality of positive displacement metering devices one connected to each of said conduits, a plurality of discharge ducts one connected to each of said positive displacement metering devices, a bypass round at least one of said positive displacement metering devices from the conduit to which said one of said positive displacement metering devices is connected to the discharge duct connected to said one of said positive displacement metering devices, a normally closed bypass valve in said bypass, spring means for urging said bypass valve into its closed position against the inlet pressure of said one of said positive displacement metering devices, and means separate of said one of said positive displacement metering devices which means is operable to overcome said spring means and open said bypass valve, said spring means loading said bypass valve to its closed position with a load which together with the pressure load on said bypass valve due to the discharge pressure of said one of said metering devices is always greater than the pressure load on said bypass valve due to the inlet pressure of said one of said metering devices.

3. A liquid supply system comprising a plurality of liquid reservoirs, a plurality of conduits one from each reservoir, a plurality of positive displacement metering devices one connected to each of said conduits to receive liquid therefrom, a plurality of discharge ducts one connected to each of said positive displacement metering devices, a plurality of bypasses one for each metering device connected at one end to the one of said conduits connected to said one of said metering devices and at the other end to the one of said discharge ducts connected to the said one of said metering devices, a plurality of normally closed bypass valves one in each of said bypasses, means operable to open said normally closed bypass valves, a common header connected to said discharge ducts to receive liquid from all said discharge ducts, and a common outlet pipe from said header.

4. In an aircraft, a liquid fuel supply system comprising a liquid fuel reservoir, a conduit from said liquid fuel reservoir, a positive displacement metering device connected to said conduit, a discharge duct connected to said positive displacement metering device, a bypass round said positive displacement metering device connected between said conduit and said discharge duct, a normally closed bypass valve in said bypass, means separate from said positive displacement metering device which means is operable to open said bypass valve, a non-return valve for normally preventing reverse flow of liquid fuel back to said liquid fuel reservoir through said conduit, means operable to hold said non-return valve open so as to permit a reverse flow of liquid fuel to said reservoir, said means including an electrically operated actuator, a fluid operated switch located in said liquid reservoir to be operated when liquid fills said liquid reservoir to the required level and connected to said actuator and arranged so that when said switch is operated said actuator is actuated to allow said non-return valve to close.

5. A liquid supply system comprising a plurality of liquid reservoirs, and, for each liquid reservoir a conduit connected to said reservoir, a positive displacement metering device connected to said conduit, a discharge duct connected to said positive displacement metering device, a bypass round said positive displacement metering device connected to said conduit and to said discharge duct, a normally closed bypass valve in said bypass and means operable to open said normally closed bypass valve, said liquid supply system further comprising a common header to which the discharge ducts of all said liquid reservoirs are connected, an outlet pipe from said common header, and a vent valve connected to said common header which vent valve is of the kind which opens when gas collects in the top of said common header but which closes when said header is filled with liquid, said positive displacement metering devices of all said reservoirs being connected to rotate together.

6. For use in a liquid supply system a valve structure comprising a casing, a first valve port in said casing, an outlet port in said casing on one side of said first valve port, a first inlet port in said casing on the other side of said first valve port, a second valve port in said casing co-axial with said first valve port and on the side of said first inlet port remote from said first valve port, a second inlet port in said casing on the side of said second valve port remote from said first valve port, a mushroom non-return valve seating on said first valve port and having a first valve stem extending towards said second valve port, a second valve seating on said second valve port and having a hollow stem extending towards said first valve port and receiving said stem of said mushroom valve, a structure fixed with respect to the said casing and extending within said casing between said first valve and said second valve, a compression spring abutting between said structure and said second valve, a further valve stem for said second valve extending on the side thereof remote from said first valve, an aperture in said further valve stem and a crankshaft journalled in said casing and having its crank received in said aperture.

7. For use in a liquid supply system a valve structure as claimed in claim 6 in combination with a rotor housing having a first outlet duct connected to said first inlet port, a second outlet duct connected to said second inlet port, a rotor chamber connected to said first outlet duct, a positive displacement rotor mounted to rotate in said rotor chamber and an inlet in said housing connected to said rotor chamber and to said second outlet duct.

8. In an aircraft, a liquid fuel supply system comprising a plurality of liquid fuel reservoirs, a plurality of fuel conduits one from each of said reservoirs, a plurality of positive displacement metering devices one connected to each of said conduits to receive liquid fuel therefrom, said metering devices each being of the kind comprising a chamber, and a rotor eccentrically mounted within the chamber, the rotor carrying a plurality of vanes, the outer edges of which are resiliently urged into contact with the internal wall of the chamber, said vanes being reciprocated with respect to the rotor as the rotor is rotated, means drivably connecting said rotors so that they rotate together, a plurality of discharge ducts one connected to each of said metering devices to receive the discharge therefrom, a plurality of by-passes one for each metering device connected at one end to the one of said conduits connected to said one of said metering devices and at the other end to the one of said discharge ducts connected to the one of said metering devices, a plurality of normally closed by-pass valves one in each of said by-passes, means operable to open said normally closed by-pass valves, a common header connected to said discharge ducts to receive liquid fuel from all said discharge ducts, and a common outlet pipe from said header, and a plurality of non-return valves, one for each liquid fuel reservoir for preventing reverse flow of liquid fuel back to the reservoir from said common header.

9. For use in a liquid fuel supply system, a fuel metering unit comprising a housing, a first liquid fuel conduit in said housing, a second liquid fuel conduit in said housing, a rotor chamber in said housing and connected to said first liquid fuel conduit, a positive displacement vane-type rotor eccentrically mounted within said rotor chamber for rotation therein to discharge liquid fuel from said chamber into said first liquid fuel conduit, a liquid fuel inlet in said housing and connected to said rotor chamber and to said second liquid fuel conduit, a valve casing in said housing, a first valve port in said casing, a liquid fuel outlet port in said casing on one side of said first valve port, a first liquid fuel inlet port in said casing and connected to said first liquid fuel conduit, said first liquid fuel inlet port being on the other side of said first valve port, a second valve port in said casing co-axial with said first valve port and on the side of said first liquid fuel inlet port remote from said first valve port, a second liquid fuel inlet port in said casing and connected to said second liquid fuel conduit, said second liquid fuel inlet port being on the side of said second valve port remote from said first valve port, a mushroom non-return valve seating on said first valve port and having a first valve stem extending towards said second valve port, a second valve seating on said second valve port and having a hollow stem extending towards said first valve port and receiving said stem of said mushroom valve, a structure fixed with respect to said valve casing and extending within said casing between said first valve and said second valve, a compression spring abutting between said structure and said second valve, a further valve stem for said second valve extending on the side thereof remote from said first valve, said further valve stem having an aperture, and a crankshaft journalled in said casing and having its crank received in said aperture.

10. For use in a liquid supply system, a unit comprising a housing, at least two first liquid outlet ducts in said housing, for each first liquid outlet duct a second liquid outlet duct and a rotor chamber in said housing, the rotor chamber being connected to the first liquid outlet duct, for each rotor chamber a positive displacement rotor mounted to rotate therein, means drivably connecting the rotors so that they rotate together, a plurality of liquid inlet ducts in said housing, one connected to each of said rotor chambers, a plurality of bypasses in said housing, one for each of said rotor chambers, said bypasses each connecting one of said liquid inlet ducts to one of said second liquid outlet ducts a normally closed bypass valve in each second liquid outlet duct, and, for each bypass valve, means operatively connected with the valve and operable independently of the rotation of said rotors to open the valve.

11. In an aircraft, a liquid fuel supply system comprising more than four liquid fuel reservoirs, at least two fuel metering units each comprising a housing, said housings together having, for each liqiud fuel reservoir, a first liquid fuel outlet duct, a second liquid fuel outlet duct, a rotor chamber connected to said first liquid fuel outlet duct, a positive displacement rotor mounted to rotate in said rotor chamber, a liquid fuel inlet connected to said rotor chamber and to the second outlet duct, a normally closed bypass valve in the second outlet duct, and means operable independently of the rotation of the rotor to open the normally closed bypass valve, said fuel metering units each further comprising means drivably connecting the rotors of the unit so that they rotate together, a header chamber connected to all the liquid fuel outlet ducts of the unit, and a fuel outlet from the header chamber, and the system further comprising a plurality of fuel conduits one from each of said reservoirs to one of the liquid fuel inlets, and a fuel conduit connected to the fuel outlets from said header chambers.

12. In an aircraft, a liquid fuel supply system comprising a plurality of liquid fuel reservoirs, a plurality of fuel conduits one from each of said reservoirs, a plurality of positive displacement metering devices one connected to each of said conduits to receive liquid fuel therefrom, said metering devices each being of the kind comprising a chamber and a rotor eccentrically mounted within the chamber, the rotor carrying a plurality of vanes the outer edges of which are resiliently urged into contact with the internal wall of the chamber, said vanes being reciprocated with respect to the rotor as the rotor is rotated, motor means for driving all said rotors together, a plurality of discharge ducts one connected to each of said metering devices to receive the discharge therefrom, a plurality of bypasses one for each metering device connected at one end to the one of said conduits connected to said one of said metering devices and at the other end to the one of said discharge ducts connected to the one of said metering devices, a plurality of normally closed bypass valves one in each of said bypasses, means operable to open said normally closed bypass valves, a common header connected to said discharge ducts to receive liquid fuel from all said discharge ducts, a common outlet pipe from said header, and a plurality of non-return valves, one for each liqiud fuel reservoir for preventing reverse flow of liquid fuel back to the reservoir from said common header.

13. In an aircraft, a liquid fuel supply system comprising a plurality of liquid fuel reservoirs, a plurality of fuel conduits one from each reservoir, a plurality of positive displacement fuel metering devices, one connected to each of said conduits, motor means connected to drive all said positive displacement metering devices together, a plurality of fuel discharge ducts one connected to each of said positive displacement fuel metering devices, a plurality of bypasses one for each fuel metering device connected at one end to the one of said fuel conduits connected to said one of said fuel metering devices and at the other end to the one of said fuel discharge ducts connected to the said one of said fuel metering devices, a plurality of normally closed bypass valves one in each of said bypasses, a common header connected to said fuel discharge ducts, a common outlet pipe from said header, a plurality of non-return valves one for each liquid fuel reservoir for preventing reverse flow of liquid fuel back to the reservoir from said common header, means operable to open each of said normally closed bypass valves, and means operable to hold each of said non-return valves open.

References Cited in the file of this patent

UNITED STATES PATENTS

| Number | Name | Date |
|---|---|---|
| 465,212 | Schilling | Dec. 15, 1891 |
| 1,618,436 | Kapuezin | Feb. 22, 1927 |
| 1,776,877 | Yonkers | Sept. 30, 1930 |
| 1,888,866 | Russel | Nov. 22, 1932 |
| 2,203,980 | Burt | June 11, 1940 |
| 2,394,431 | Curtis et al. | Feb. 5, 1946 |
| 2,503,424 | Snyder | Apr. 11, 1950 |
| 2,535,094 | Someran | Dec. 26, 1950 |
| 2,551,836 | Gendreau | May 8, 1951 |
| 2,564,306 | Isreeli et al. | Aug. 14, 1951 |

FOREIGN PATENTS

| Number | Country | Date |
|---|---|---|
| 556,212 | Great Britain | Jan. 18, 1943 |